US008105222B2

(12) United States Patent
Lin

(10) Patent No.: US 8,105,222 B2
(45) Date of Patent: Jan. 31, 2012

(54) ROLLER DEVICE FOR A TONER CARTRIDGE

(76) Inventor: Keng-Hsien Lin, Kaohsiung (TW)

(*) Notice: Subject to any disclaimer, the term of this patent is extended or adjusted under 35 U.S.C. 154(b) by 1099 days.

(21) Appl. No.: 11/998,092

(22) Filed: Nov. 27, 2007

(65) Prior Publication Data

US 2009/0136268 A1 May 28, 2009

(51) Int. Cl.
*F16C 13/00* (2006.01)

(52) U.S. Cl. ............... 492/56; 492/47; 492/59; 399/286

(58) Field of Classification Search .................... 492/56, 492/59, 18, 38, 47, 49; 399/286, 115, 116, 399/122

See application file for complete search history.

(56) References Cited

U.S. PATENT DOCUMENTS 6,283,903 B1 * 9/2001 Onuki et al. .................... 492/56
6,512,911 B2 * 1/2003 Arai et al. ..................... 399/286
6,945,921 B2 9/2005 Sirejacob
7,526,239 B2 * 4/2009 Kawano et al. ............... 399/286
2007/0003329 A1 * 1/2007 Kim .............................. 399/286

OTHER PUBLICATIONS

Properties and Characteristics of Urethane, Rubber.*

* cited by examiner

*Primary Examiner* — Sarang Afzali
(74) *Attorney, Agent, or Firm* — Kilpatrick Townsend & Stockton LLP

(57) ABSTRACT

A roller device for a toner cartridge includes a spindle and a roller body. The roller body has a foam layer disposed around the spindle, and an outer tube disposed around the foam layer. Both of the outer tube and the foam layer are made of a thermoplastic material. The roller body has a bulk resistance ranging from $10^2$ ohms to $10^{10}$ ohms.

8 Claims, 8 Drawing Sheets

ROLLER DEVICE FOR A TONER CARTRIDGE

BACKGROUND OF THE INVENTION

1. Field of the Invention

This invention relates to a roller device, more particularly to a roller device for a toner cartridge of a laser printer.

2. Description of the Related Art

Referring to FIG. 1, a toner cartridge 1 of a currently existing laser printer includes a casing 11, a photo conductor drum 12 disposed in the casing 11, a developer roller 13 and a primary charge roller 14 abutting against a periphery of the photo conductor drum 12 and angularly spaced apart from each other, and a transfer roller 15 abutting against the periphery of the photo conductor drum 12 and located between the developer roller 13 and the primary charge roller 14.

In use, the primary charge roller 14 guides uniformly a negative electrostatic charge to the periphery of the photo conductor drum 12, after which the developer roller 13 spreads the toner to the periphery of the photo conductor drum 12 at required locations. Finally, the photo conductor drum 12 is pressed over a paper 100 to transfer the toner to the paper 100 through the transfer roller 15, thereby completing a printing job.

Referring to FIG. 2, in combination with FIG. 1, each of the rollers 13, 14, 15 of the toner cartridge 1 includes a roller body 21, and a metal rod 22 inserted into the roller body 21. The roller body 21 includes a tubular sleeve 211 made of polyamide, and a foam body 212 filled within the tubular sleeve 211 and made of polyurethane. The metal rod 22 is inserted into the foam body 212.

Due to the fact that a connecting force between two different materials is poor, the tubular sleeve 211 and the foam body 212 cannot completely and tightly adhere to each other. Thus, the problem of poor printing quality always exists. In order to enhance the connecting force between the tubular sleeve 211 and the foam body 212, an inner wall of the tubular sleeve 211 is applied with an adhesive. However, this only complicates the manufacturing process of the aforementioned rollers 13, 14, 15. The conventional manufacturing process involves forming the foam body 212 on an outer periphery of the metal rod 22 first, after which the tubular sleeve 211 is sleeved on an outer periphery of the foam body 212. Alternatively, the metal rod 22 may be inserted first into the tubular sleeve 211 and positioned therein, after which the foam body 212 is filled within the tubular sleeve 211, thereby obtaining the aforementioned structure of the rollers 13, 14, 15. However, to position the metal rod 22 in the soft-quality tubular sleeve 211 is difficult. Even after the metal rod 22 is positioned in the tubular sleeve 211, when the foam body 212 is filled within the tubular sleeve 211, the metal rod 22 easily displaces. Hence, the rollers 13, 14, 15 are deflected during rotation of the same. This results in printing defects.

Moreover, although the foam body 212, which is made of polyurethane, decomposes naturally, when connected with the tubular sleeve 211, which is made of polyamide, using an adhesive as described above, the assembly of the foam body 212 and the tubular sleeve 211 is not easily recycled for reuse.

To resolve the aforementioned problems associated with a complicated manufacturing process and poor connection between different materials, U.S. Pat. No. 6,945,921 discloses a roller that is coated with a polysiloxane containing carbon black resin layer to ensure a tight connection between layers of materials. However, the coating process is time-consuming. Also, it is difficult to thicken the coating layer, so that the polysiloxane containing carbon black resin layer is thin, and is thus easily worn off, thereby affecting the service life of the toner cartridge.

SUMMARY OF THE INVENTION

Therefore, the object of the present invention is to provide a roller device that is capable of overcoming the aforementioned drawbacks of the prior art.

According to this invention, a roller device for a toner cartridge comprises a spindle and a roller body. The roller body has a foam layer disposed around the spindle, and an outer tube disposed around the foam layer. Both of the outer tube and the foam layer are made of a thermoplastic material. The roller body has a bulk resistance ranging from $10^2$ ohms to $10^{10}$ ohms.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
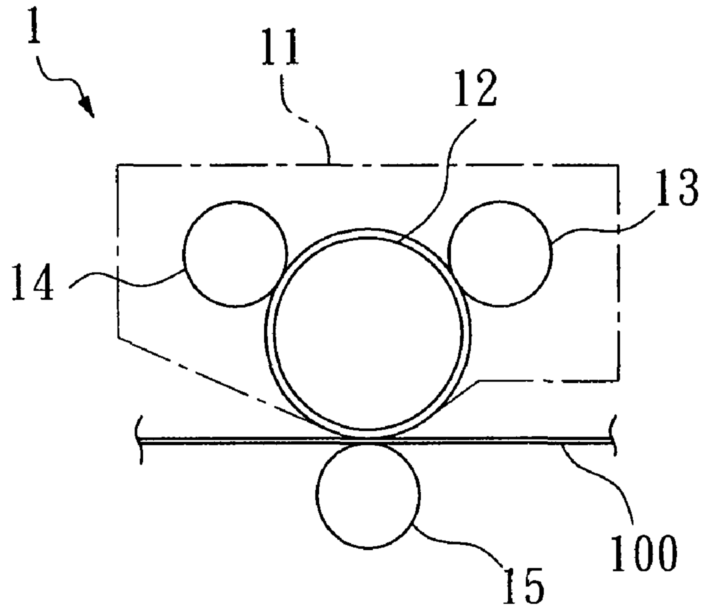
FIG. 1 PRIOR ART
FIG. 1 is a schematic view, illustrating some parts of a conventional toner cartridge for a laser printer.

Before the present invention is described in greater detail, it should be noted that the same reference numerals have been used to denote like elements throughout the specification.

Figure 3:
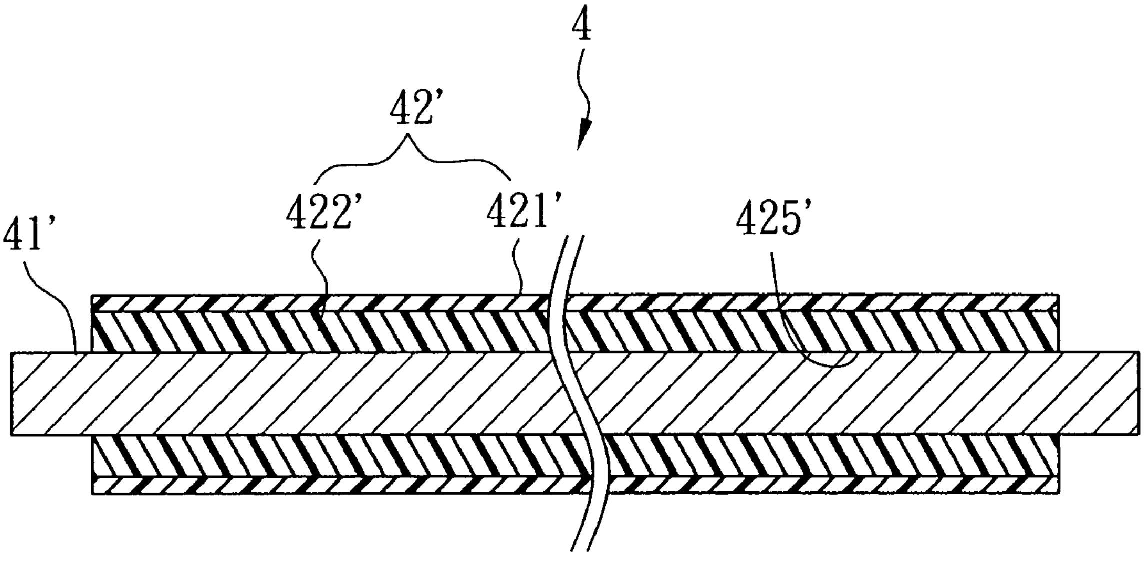
FIG. 3 is a fragmentary sectional view of a roller device according to the first preferred embodiment of the present invention.
Figure 4:
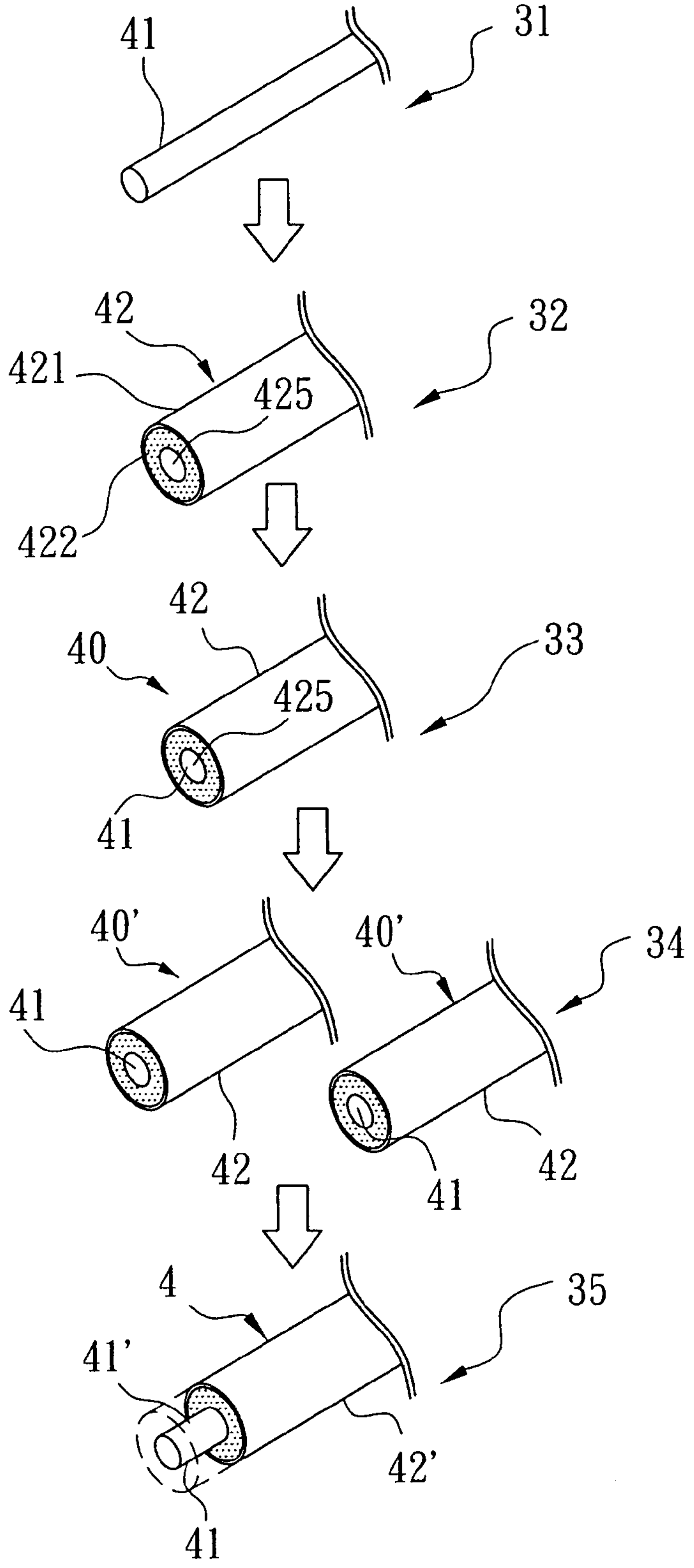
FIG. 4 is a fragmentary perspective view, illustrating the consecutive steps involved in producing the roller device of the first preferred embodiment.

Referring to FIG. 3, a roller device 4 for a toner cartridge according to the first preferred embodiment of the present invention is shown to comprise a roller body 42', which includes an outer tube 421' and a foam layer 422' disposed in the outer tube 421', and a spindle 41' inserted into a central hole 425' in the foam layer 422'. Since the outer tube 421' and the foam layer 422' are made of the same thermoplastic material, they can be tightly bonded to each other, and are therefore not easily separated. Further, since the thermoplastic material is a recyclable material that may be reused, environmental protection may be achieved. Referring to FIG. 4, the roller device 4 of the first preferred embodiment is produced using the below steps.

In step 31, a metal rod 41 is prepared. The metal rod 41 may be made of iron or an alloy.

In step 32, a cylindrical rod 42 is prepared. The cylindrical rod 42 has an outer tube 421 made of a thermoplastic material and having a hardness ranging from 45 ShoreA to 70 ShoreD, and a foam layer 422 that is disposed in the outer tube 421, that is made of a thermoplastic material, and that has a density ranging from 0.2 $g/cm^3$ to 0.8 $g/cm^3$. The foam layer 422 has a central hole 425 extending along the length of the cylindrical rod 42. In this embodiment, the outer tube 421 has a resistance ranging from $10^3$ ohms to $10^{10}$ ohms. As the outer tube 421 and the foam layer 422 are made of thermoplastic material, they may be formed at the same time by a co-extrusion process.

According to the invention, the outer tube 421 and the foam layer 422 are made of the same thermoplastic material. The thermoplastic material usable for making the outer tube 421 and the foam layer 422 should be one which can provide the roller body 42' with a resistance level that meets the requirements of a toner cartridge. Preferably, the roller body 42' has a bulk resistance ranging from $10^2$ ohms to $10^{10}$ ohms. A preferred thermoplastic material is selected from the group consisting of thermoplastic polyurethane and a copolymer of the thermoplastic polyurethane. The copolymer includes the thermoplastic polyurethane and a polymer. The polymer is selected from the group consisting of acrylonitrile-butadiene-styrene (ABS), polycarbonate (PC), polyamide (PA), thermoplastic elastomer (TPE), and a mixture of the same. The total weight of the polymer is less than 30% by weight based on 100% by weight of the copolymer.

In step 33, the metal rod 41 is inserted into the central hole 425 of the cylindrical rod 42, thereby forming a rod combination 40.

Instep 34, the rod combination 40 is cut into a plurality of semi-finished rollers 40' (two are shown in FIG. 4) each with a preset length. It should be noted that if the length of the rod combination 40 is equal to the preset length of each semi-finished roller 40', then step 34 may be omitted.

In step 35, parts of the thermoplastic material of each semi-finished roller 40' are removed at two opposite ends thereof (only one end of one of the semi-finished rollers 40' is shown in FIG. 4), so that two opposite ends of the metal rod 41 are exposed (only one end of the metal rod 41 is shown in FIG. 4), thereby obtaining the roller device 4 of the present invention that has the spindle 41'.

Figure 5:
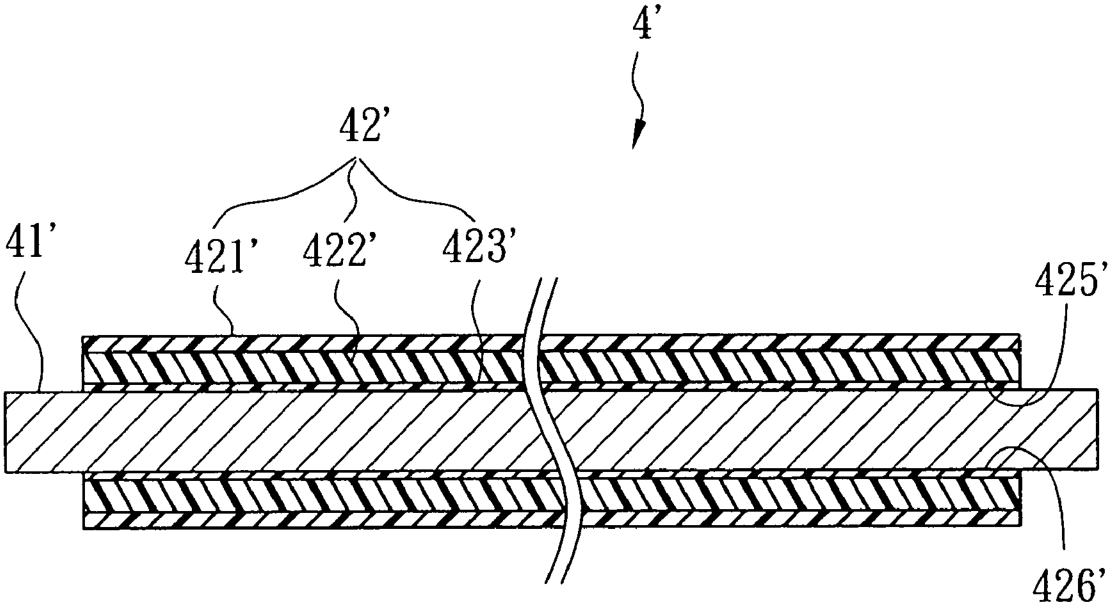
FIG. 5 is a fragmentary sectional view of a roller device according to the second preferred embodiment of the present invention.

Referring to FIG. 5, a roller device 4' according to the second preferred embodiment of the present invention is shown to be similar to the first preferred embodiment. However, in this embodiment, the roller body 42' further includes an inner tube 423' inserted into the central hole 425' of the foam layer 422' and made of a thermoplastic material. The spindle 41' is inserted into a central slot 426' of the inner tube 423'. As such, the inner tube 423' is disposed between the spindle 41' and the foam layer 422'. Since the outer tube 421', the foam layer 422', and the inner tube 423' are made of the same thermoplastic material, they can be tightly bonded to each other, and are therefore not easily separated.

Figure 6:
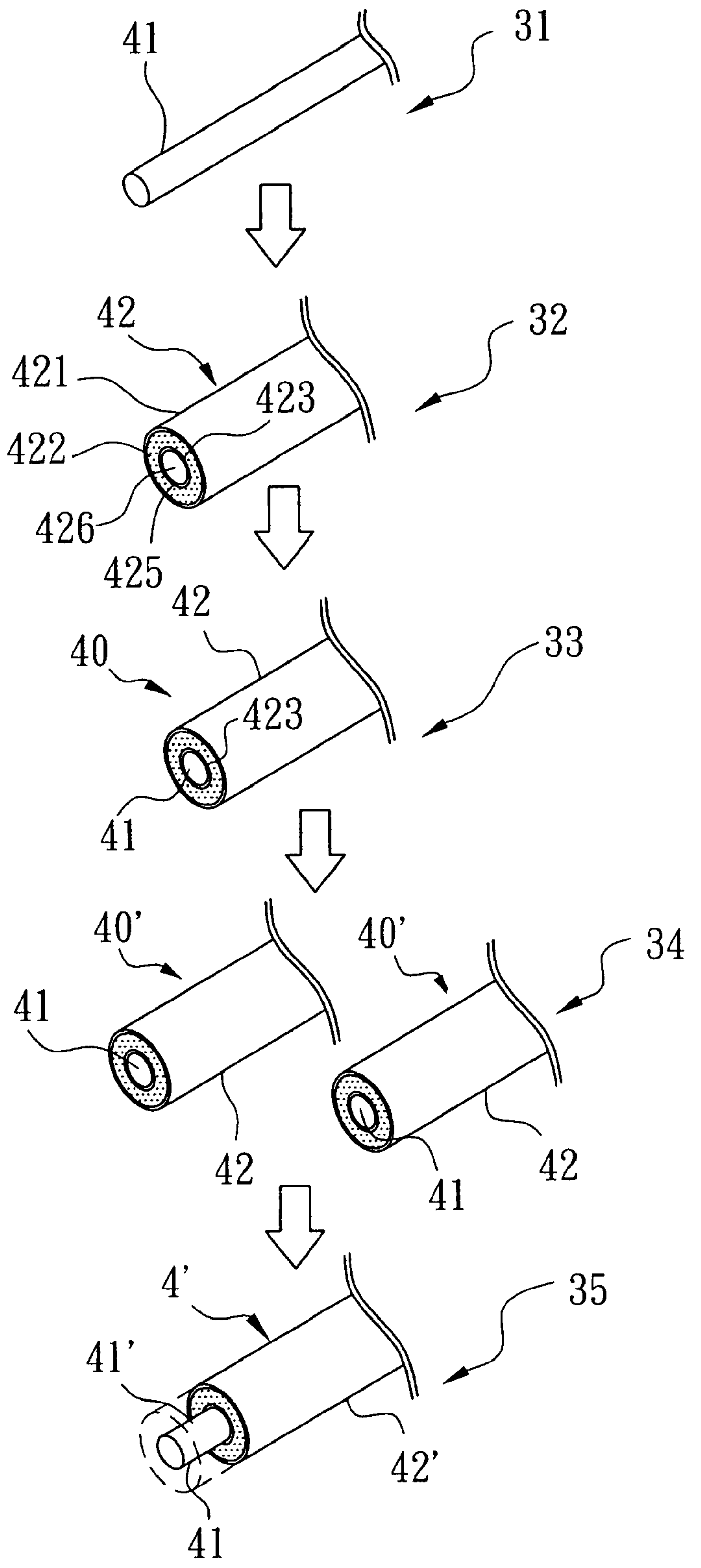
FIG. 6 is a fragmentary perspective view, illustrating the consecutive steps involved in producing the roller device of the second preferred embodiment.

Referring to FIG. 6, the roller device 4' of the second preferred embodiment is shown as being produced with the same steps as those described in the first preferred embodiment. However, in step 32, the cylindrical rod 42 further includes an inner tube 423 disposed in the central hole 425 and connected to an inner periphery of the foam layer 422. The inner tube 423 is made of a thermoplastic material similar to that of the outer tube 421, and has a central slot 426. Further, in step 33, the metal rod 41 is inserted into the central slot 426 in the inner tube 423, thereby forming a rod combination 40. The inner tube 423 has a hardness ranging from 45 ShoreA to 70 ShoreD.

Figure 7:
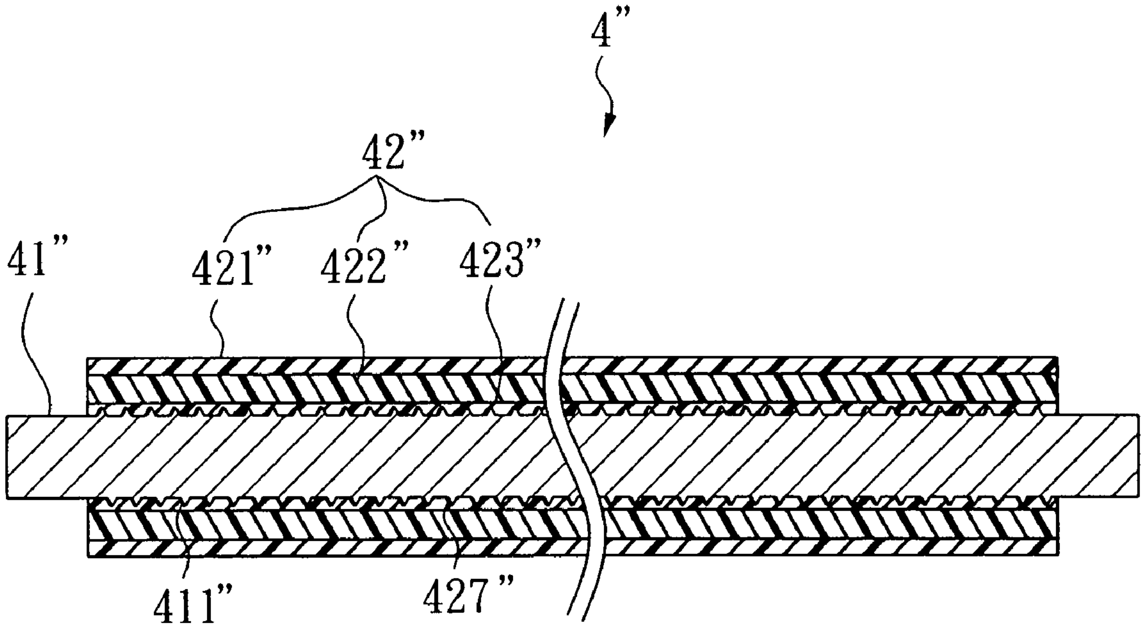
FIG. 7 is a fragmentary sectional view of a roller device according to the third preferred embodiment of the present invention.

Referring to FIG. 7, a roller device 4" according to the third preferred embodiment of the present invention is shown to be similar to the second preferred embodiment. However, in this embodiment, an outer periphery of the spindle 41" is formed with an external thread 411", and an inner periphery of the inner tube 423" is formed with an internal thread 427" engaged to the external thread 411" of the spindle 41". Aside from having the advantages of the first and second preferred embodiments, through threaded engagement between the internal thread 427" of the inner tube 423" and the external thread 411" of the spindle 41", connection between the roller body 42" and the spindle 41" of the roller device 4" of the third preferred embodiment is further enhanced, so that the difficulty of inserting the spindle 41" into the roller body 42" can be resolved.

Figure 8:
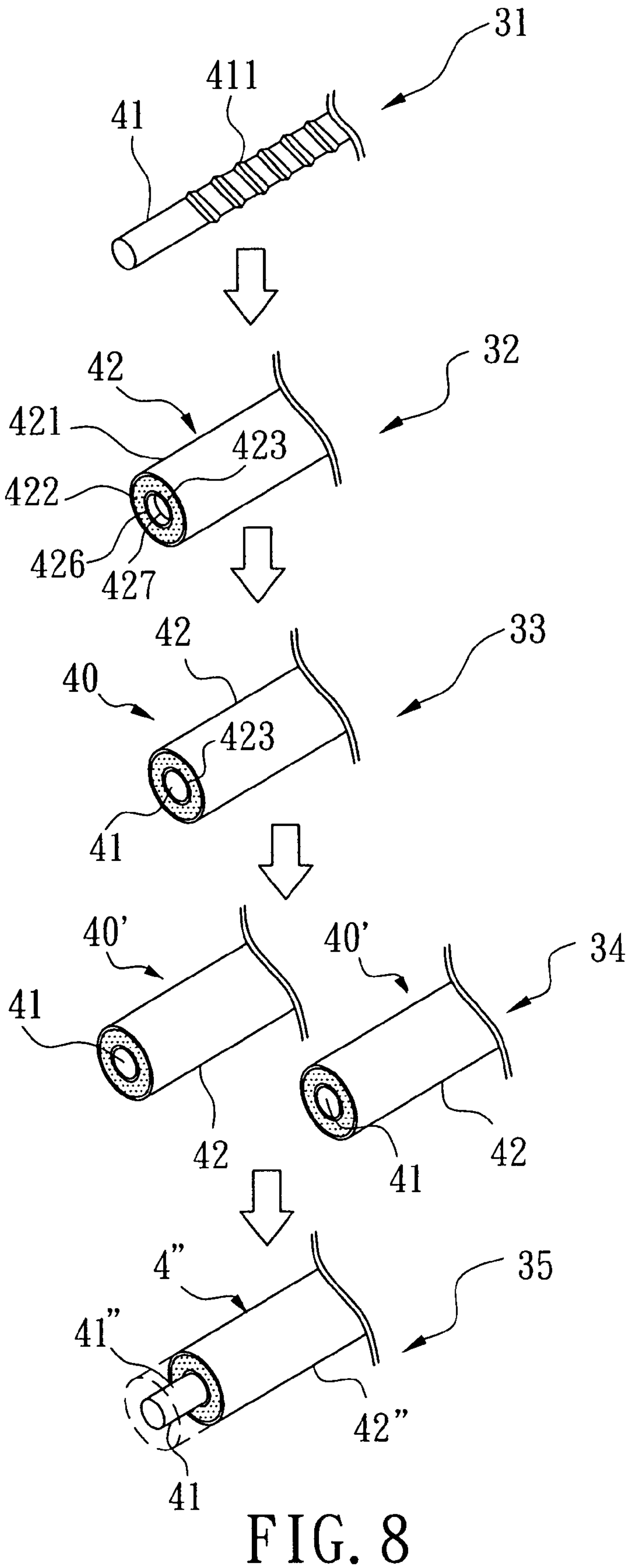
FIG. 8 is a fragmentary perspective view, illustrating the consecutive steps involved in producing the roller device of the third preferred embodiment.

Referring to FIG. 8, the roller device 4" of the third preferred embodiment is shown as being produced with the same steps as those described in the second preferred embodiment. However, in step 31, an external thread 411 is provided on an outer periphery of the metal rod 41. In step 32, an internal thread 427 is provided on an inner periphery of the inner tube 423 to engage the external thread 411 of the metal rod 41. In step 33, the metal rod 41 is engaged threadedly to the inner tube 423, thereby forming a rod combination 40.

Figure 9:
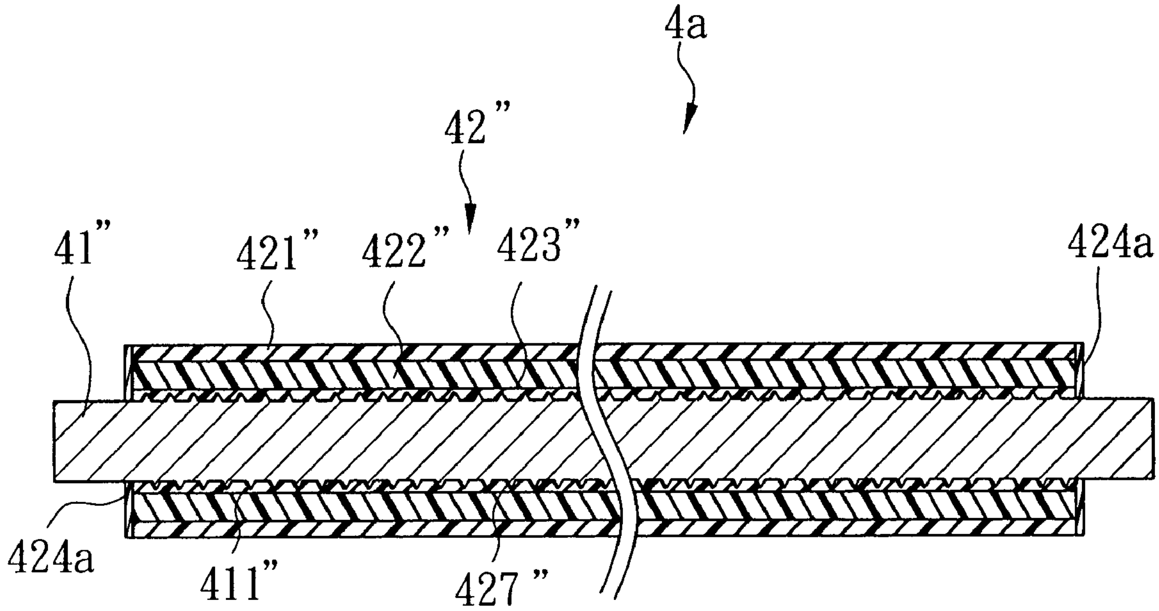
FIG. 9 is a fragmentary sectional view of a roller device according to the fourth preferred embodiment of the present invention.

Referring to FIG. 9, a roller device (4*a*) for a toner cartridge according to the fourth preferred embodiment of the present invention is shown to be similar to the third preferred embodiment. However, in this embodiment, the roller device (4*a*) further comprises two sealing plates (424*a*) provided respectively on two opposite ends of the roller body 42" so as to cover the foam layer 422". The sealing plates (424*a*) are made of a thermoplastic material similar to those of the outer tube 421", the foam layer 422", and the inner tube 423". The sealing plates (424*a*) seal the respective ends of the roller body 42" so as to prevent carbon powder in the toner cartridge from contacting the foam layer 422".

Figure 2:
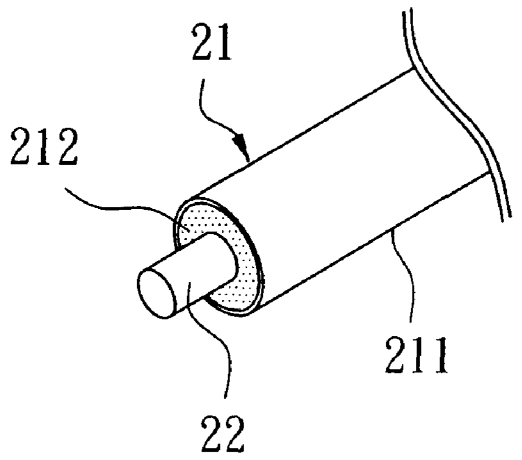
FIG. 2 PRIOR ART
FIG. 2 is a fragmentary perspective view of a roller of the toner cartridge of FIG. 1.

From the aforementioned description, it is apparent that the roller device 4, 4', 4", (4*a*) for the toner cartridge according to the present invention makes use of the roller body 42', 42", which is made of a thermoplastic material, and the spindle 41', 41" which is inserted into the roller body 42', 42" so as to overcome the problems associated either with the connection between the tubular sleeve 211 and the foam body 212 of the conventional rollers 13, 14, 15 shown in FIGS. 1 and 2, or with the complicated manufacturing process of coating the roller with the polysiloxane containing carbon black resin layer, as disclosed in U.S. Pat. No. 6,945,921.

Further, since the outer tube 421', 421", the foam layer 422', 422", the inner tube 423', 423", and the sealing plates (424*a*) are made of the same thermoplastic material, connection there among is enhanced, so that the roller device 4, 4', 4", (4*a*) of the present invention enables achievement of high quality and stable printing, and has a long service life. Moreover, the roller device 4, 4', 4", (4*a*) of the present invention comprises the foam layer 422', 422" with a density ranging from 0.2 $g/cm^3$ to 0.8 $g/cm^3$, the outer tube 421', 421" with a hardness ranging from 45 ShoreA to 70 ShoreD and with a resistance value ranging from $10^3$ ohms to $10^{10}$ ohms, and the roller body 42', 42" with a bulk resistance ranging from $10^2$ ohms to $10^{10}$ ohms, that satisfy the quality requirements of the primary charge roller 14 (see FIG. 1) and the transfer roller 15 (see FIG. 1) of the toner cartridge 1 (see FIG. 1).

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. A roller device for a toner cartridge, comprising: a spindle; and a roller body having a foam layer disposed around said spindle, and an outer tube disposed around said foam layer, both of said outer tube and said foam layer being made of a thermoplastic material, said roller body having an overall resistance ranging from $10^2$ ohms to $10^{10}$ ohms;

wherein said roller body further has an inner tube disposed between said spindle and said foam layer, said inner tube, said outer tube and said foam layer being made of the same thermoplastic material which is selected from the group consisting of thermoplastic polyurethane and a copolymer of the thermoplastic polyurethane; and wherein said inner tube has an inner periphery provided with an internal thread, and said spindle has an outer periphery provided with an external thread to engage said internal thread.

2. The roller device of claim 1, wherein said outer tube and said foam layer are made of the same thermoplastic material, which is selected from the group consisting of thermoplastic polyurethane and a copolymer of the thermoplastic polyurethane.

3. The roller device of claim 2, wherein the copolymer includes the thermoplastic polyurethane, and a polymer which is selected from the group consisting of acrylonitrile-butadiene-styrene (ABS), polycarbonate (PC), polyamide (PA), thermoplastic elastomer (TPE), and a mixture thereof.

4. The roller device of claim 3, wherein the amount of the polymer is less than 30% by weight based on 100% by weight of the copolymer.

5. The roller device of claim 1, wherein said outer tube has a hardness ranging from 45 ShoreA to 70 ShoreD.

6. The roller device of claim 1, wherein each of said inner and outer tubes has a hardness ranging from 45 ShoreA to 70 ShoreD.

7. The roller device of claim 1, wherein said foam layer has a density ranging from 0.2 $g/cm^3$ to 0.8 $g/cm^3$.

8. The roller device of claim 1, wherein said roller body further has two sealing plates respectively disposed on two opposite sides of said outer tube and covering said foam layer.

* * * * *